US012206925B2

(12) United States Patent
Sinha et al.

(10) Patent No.: US 12,206,925 B2
(45) Date of Patent: Jan. 21, 2025

(54) SYSTEMS AND METHODS FOR CONTENT CUSTOMIZATION

(71) Applicant: ADOBE INC., San Jose, CA (US)

(72) Inventors: Atanu R. Sinha, Bangalore (IN); Aurghya Maiti, Kolkata (IN); Atishay Ganesh, Karnataka (IN); Saili Myana, Telangana (IN); Harshita Chopra, Delhi (IN); Sarthak Kapoor, Delhi (IN); Saurabh Mahapatra, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 275 days.

(21) Appl. No.: 17/813,622

(22) Filed: Jul. 20, 2022

(65) Prior Publication Data

US 2024/0031631 A1    Jan. 25, 2024

(51) Int. Cl.
*H04N 21/25* (2011.01)
*H04N 21/2668* (2011.01)

(52) U.S. Cl.
CPC ....... *H04N 21/2668* (2013.01); *H04N 21/252* (2013.01)

(58) Field of Classification Search
CPC .................................................. H04N 21/252
See application file for complete search history.

(56) References Cited

U.S. PATENT DOCUMENTS

| 2014/0223575 | A1* | 8/2014 | Nandi | H04N 21/4826 |
| | | | | 726/27 |
| 2017/0195731 | A1* | 7/2017 | Girlando | H04N 21/4312 |
| 2022/0293267 | A1* | 9/2022 | Kumar Karn | G16H 50/20 |
| 2023/0007344 | A1* | 1/2023 | Sahasi | H04L 65/4015 |
| 2023/0135659 | A1* | 5/2023 | Wu | G06N 3/044 |
| | | | | 706/21 |
| 2023/0419046 | A1* | 12/2023 | Khan | G06F 18/2155 |

OTHER PUBLICATIONS

Bahdanau, et al., "Neural Machine Translation by Jointly Learning to Align and Translate", arXiv preprint arXiv:1409.0473v7 [cs.CL] May 19, 2016, 15 pages.

Bhat, "Incorporating Observed and Unobserved Heterogeneity in Urban Work Travel Mode Choice Modeling", in Transportation Science, vol. 34, No. 2, May 2000, pp. 228-238, available at https://www.jstor.org/stable/25768911.

Bowman and McCormick, "Market Segmentation and Marketing Mixes", In: Journal of Marketing, vol. 25, No. 3, Jan. 1961, pp. 25-29, available at https://www.jstor.org/stable/1249528.

(Continued)

*Primary Examiner* — Michael H Hong

(74) *Attorney, Agent, or Firm* — F. CHAU & ASSOCIATES, LLC

(57) ABSTRACT

Systems and methods for content customization are provided. One aspect of the systems and methods includes receiving dynamic characteristics for a plurality of users, wherein the dynamic characteristics include interactions between the plurality of users and a digital content channel; clustering the plurality of users in a plurality of segments based on the dynamic characteristics using a machine learning model; assigning a user to a segment of the plurality of segments based on static characteristics of the user; and providing customized digital content for the user based on the segment.

18 Claims, 7 Drawing Sheets

(56) References Cited

OTHER PUBLICATIONS

Guo, et al., "Exploring Interpretable LSTM Neural Networks over Multi-Variable Data", arXiv preprint arXiv:1905.12034v1 [cs.LG] May 28, 2019, 17 pages.

Lee and van der Schaar, "Temporal Phenotyping using Deep Predictive Clustering of Disease Progression", arXiv preprint arXiv:2006.08600v1 [physics.med-ph] Jun. 15, 2020, 19 pages.

Mukherjee, et al., "ClusterGAN: Latent Space Clustering in Generative Adversarial Networks", arXiv preprint arXiv:1809.03627v2 [cs.LG] Jan. 26, 2019, 25 pages.

Pi, et al., "Practice on Long Sequential User Behavior Modeling for Click-Through Rate Prediction", arXiv preprint arXiv:1905.09248v3 [cs.IR] May 24, 2019, 9 pages.

Ward, Jr., "Hierarchical Grouping to Optimize an Objective Function", in Journal of the American Statistical Association, vol. 58, No. 301, Mar. 1963, pp. 236-244, available at https://www.jstor.org/stable/2282967.

Yin, et al., "Learning Transferrabel Parameters for Long-tailed Sequential User Behavior Modeling", arXiv preprint arXiv:2010.11401v2 [cs.LG] Nov. 1, 2020, 9 pages.

\* cited by examiner

SYSTEMS AND METHODS FOR CONTENT CUSTOMIZATION

BACKGROUND

The following relates generally to content distribution, and more specifically to content customization. Content customization refers to tailoring the distribution of content to a user based on data associated with the user. The data may be dynamic characteristics related to user behavior or static data related to stable user attributes.

Conventional techniques for content distribution are not predictive of a user's response to receiving digital content with respect to dynamic characteristics and static characteristics, and therefore often deliver irrelevant content to the user. There is therefore a need in the art for content customization systems and methods that extrapolate a predicted outcome for a user with respect to digital content based on dynamic characteristics and static characteristics so that the user receives customized content that encourages the occurrence of the predicted outcome.

SUMMARY

Embodiments of the present disclosure provide content customization systems and methods that cluster a set of users in a set of segments based on dynamic characteristics for the set of users using a machine learning model, assign a user to a segment of the set of segments based on a static characteristic of the user, and provide customized digital content for the user based on the segment. In some embodiments, the machine learning model approaches temporal predictive clustering by learning discrete representations of the dynamic characteristics that correspond to a distribution of future outcomes associated with the static characteristics.

By clustering the set of users in the set of segments based on the dynamic characteristics and assigning the user to the segment based on the static characteristics of the user, embodiments of the present disclosure thereby extrapolate outcomes based on user behavior, enabling a given user to be confidently included in a segment corresponding to a desired outcome (such as a purchase) and a given static characteristic (such as a given geographic location) than if static characteristics alone were used in determining the correlation.

Furthermore, by performing content customization by assigning the user to the segment based on the clustering, the system can thereby provide customized digital content for the user in a targeted manner that is informed by both dynamic characteristics and static characteristics of the user, such that a target outcome (such as a conversion) is likely to be achieved in response to the user receiving the customized digital content. For example, given dynamic characteristics of a set of users, some embodiments of the present disclosure identify behavior-based clusters that yield a set of static characteristics for each cluster. Therefore, if a third-party user such as a business wishes to identify a second set of users akin to users in a cluster based on dynamic characteristics corresponding to the cluster, but does not have access to data associated with the second set of users, the third-party user may provide a content provider with the set of static characteristics yielded by the cluster and ask the content provider to reach out to the second set of users based on the set of static characteristics.

A method, apparatus, non-transitory computer readable medium, and system for content customization are described. One or more aspects of the method, apparatus, non-transitory computer readable medium, and system include receiving dynamic characteristics for a plurality of users, wherein the dynamic characteristics include interactions between the plurality of users and a digital content channel; clustering the plurality of users in a plurality of segments based on the dynamic characteristics using a machine learning model; assigning a user to a segment of the plurality of segments based on static characteristics of the user; and providing customized digital content for the user based on the segment.

A method, apparatus, non-transitory computer readable medium, and system for content customization are described. One or more aspects of the method, apparatus, non-transitory computer readable medium, and system include receiving dynamic characteristics for a plurality of users, wherein the dynamic characteristics include interactions between the plurality of users and a digital content channel; encoding the dynamic characteristics using a machine learning model to obtain a plurality of user representations corresponding to the plurality of users; mapping the plurality of user representations to a plurality of segments; and clustering the plurality of users in the plurality of segments based on the mapping.

An apparatus and system for content customization are described. One or more aspects of the apparatus and system include a processor; a memory storing instructions executable by the processor; a data component configured to receive dynamic characteristics for a plurality of users, wherein the dynamic characteristics include interactions between the plurality of users and a digital content channel; a clustering component configured to cluster the plurality of users based on the dynamic characteristics to obtain a plurality of segments; and a segmentation component configured to assign a user to a segment of the plurality of segments based on static characteristics of the user.

DETAILED DESCRIPTION

Figure 1:
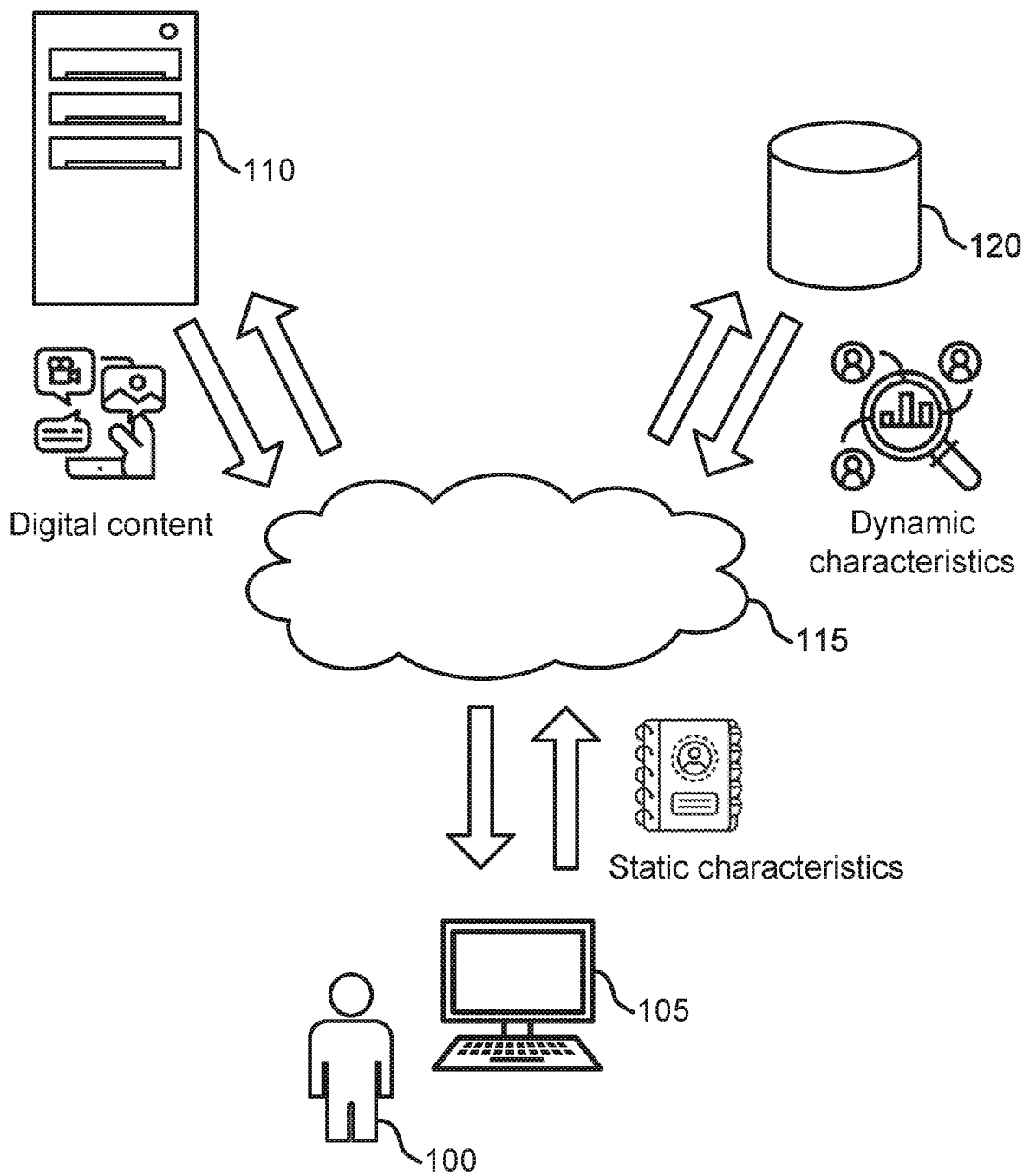
FIG. 1 shows an example of a content customization system according to aspects of the present disclosure.

The present disclosure relates generally to content distribution, and more specifically to content customization. Content customization refers to tailoring the distribution of content to a user based on data associated with the user. The data may be dynamic characteristics related to user behavior, or static data related to stable user attributes.

Conventional techniques for content distribution are not predictive of a user's response to receiving customized digital content with respect to dynamic characteristics and static characteristics, and therefore often deliver irrelevant content to the user. For example, in many cases, content providers want to provide content that encourages users to take a particular action. Conventional content distribution systems are not predictive with respect to user behavior, and therefore do not enable content providers to provide content that will encourage the desired behavior. In an example, a content distributor may want to determine if content should be provided to a given user but does not have access to the user's behavior. In contrast, embodiments of the present disclosure enable content providers to provide customized content that has a desired impact on user behavior.

Some embodiments of the present disclosure perform content customization using a latent space of static characteristics by assigning a user to a segment corresponding to a target outcome and a static characteristic based on a predictive model that takes dynamic characteristics as input. By assigning the user to the segment based on the predictive model, the system can thereby provide customized digital content for the user in a targeted manner that is informed by both dynamic characteristics and static characteristics of the user, such that a target outcome (such as a conversion) is likely to be achieved in response to the user receiving the customized digital content.

According to some aspects of the present disclosure, a content customization system includes a data component, a clustering component, a segmentation component, and a content component. According to some aspects, the data component receives dynamic characteristics for a set of users. In some embodiments, the dynamic characteristics include interactions between the set of users and a digital content channel.

According to some aspects, the clustering component clusters the set of users in a set of segments based on the dynamic characteristics using a machine learning model. In some embodiments, the machine learning model includes an actor-critic temporal predictive clustering (ACTPC) model.

According to some aspects, the segmentation component assigns a user to a segment of the set of segments based on static characteristics of the user. According to some aspects, the content component provides the customized digital content for the user based on the segment.

By using the deep learning-based machine learning model to perform predictive clustering in a static characteristics latent space based on a behavioral history of the set of users and with respect to a target outcome, such as making a purchase in response to receiving a given item of customized digital content, embodiments of the present disclosure thereby extrapolate an outcome for the user based on known behavior of the set of users and a static characteristic of the user (such as a geographic location, demographic data, etc.), enabling the user to be assigned in a segment corresponding to the target outcome and the static characteristic with a greater degree of precision than if the static characteristic alone were used in determining the assignment. Furthermore, as the user is assigned to the segment based on a strong likelihood that the target outcome will occur upon the user receiving a given item of customized digital content, the system can therefore provide the item of customized digital content for the user in an automated manner that minimizes the chances of the customized digital content being irrelevant to the user's interests.

Additionally, in some embodiments, the machine learning model is able to recognize the behavioral history of the user based on the dynamic characteristics and to cluster the set of users in segments that reflect both behaviors and target outcomes, such that users are more similar within a segment and are more dissimilar across segments, thereby providing a greater degree of differentiation among classes of users with respect to a target outcome than conventional content distribution techniques can provide.

Furthermore, by performing content customization in the latent space of static characteristics by assigning the user to the segment based on the clustering, the system can thereby provide digital content to the user in a targeted manner that is informed by both dynamic characteristics and static characteristics of the user, such that a target outcome (such as a conversion) is likely to be achieved in response to the user receiving the digital content. In contrast, conventional content distribution techniques cluster users based merely on static characteristics and are thereby weaker for predicting an outcome and providing information that is helpful in determining what content should be distributed to a given user.

In an example, in some embodiments, given dynamic characteristics of a set of users, the clustering component identifies behavior-based clusters that yield a set of static characteristics for each cluster. Therefore, if a third-party user such as a business wishes to identify a second set of users akin to users in a cluster based on dynamic characteristics corresponding to the cluster, but does not have access to data associated with the second set of users, the third-party user may provide a content provider with the set of static characteristics yielded by the cluster and ask the content provider to reach out to the second set of users based on the set of static characteristics. In contrast, conventional content distribution techniques do not determine a set of static characteristics via clustering a set of users based on dynamic characteristics, and therefore are not able to effectively extrapolate helpful static characteristics based on dynamic characteristics.

As used herein, the term "dynamic characteristics" refers to interactions between the set of users and a digital content channel. In some embodiments, the dynamic characteristics include behavioral data corresponding to time-stamped events that occur as a result of a user interaction on a digital content channel, such as an opening an email, a hyperlink click, a display click, a download, webpage visits, and the like.

As used herein, the term "digital content channel" refers to channels on which digital content may be displayed, such as websites, email, and software applications (e.g., "apps"). As used herein, "digital content" refers to any form of digital media, such as text, an image, a video, audio, or a combination thereof. In some embodiments, digital content includes a hyperlink. In some embodiments, digital content includes a marketing promotion, communication, etc. As used herein, "customized digital content" refers to digital content that is related to an outcome that is predicted to occur in response to receiving the customized digital content.

As used herein, the term "static characteristics" refers to non-dynamic data that does not directly result from user activity on a digital content channel, such as demographic information, user device geographic information, user device operating system information, user device browser information, user device media preference information, a referrer to a digital content channel, and the like.

As used herein, the term "segment" refers to a group of users who have a given static characteristic (such as a given user device geographic location) and a target outcome (such as a purchase of a given product or service). In some embodiments, the machine learning model clusters a user in a segment based on a static characteristic associated with the user and a predicted outcome (e.g., a determined likelihood that the target outcome will occur).

According to some aspects, the machine learning model includes an actor-critic temporal predictive clustering (ACTPC) model. As used herein, the term "ACTPC" refers to a deep-learning based machine learning model that approaches a temporal predictive clustering task by learning discrete representations of an input series that corresponds to a distribution of future outcomes.

An embodiment of the present disclosure is used in a digital content distribution context. In an example, a user of the system is a digital content distributor who wants to provide customized digital content on a digital content channel to a user who is likely to perform a target action as a result of receiving the customized digital content. Accordingly, the system uses dynamic characteristics for a set of users to cluster the set of users in a set of segments corresponding to predicted outcomes using the machine learning model. The system assigns a user to a segment of the set of segments based on static characteristics of the user. The system thereby extrapolates predicted outcomes in a static characteristic space based on user behavior, enabling a given user to be confidently correlated in a segment corresponding to a desired outcome (such as a purchase of a product or service associated with the customized digital content) than if static characteristics alone were used for determining the correlation. The system then provides the customized digital content for the user based on the segment.

Figure 3:
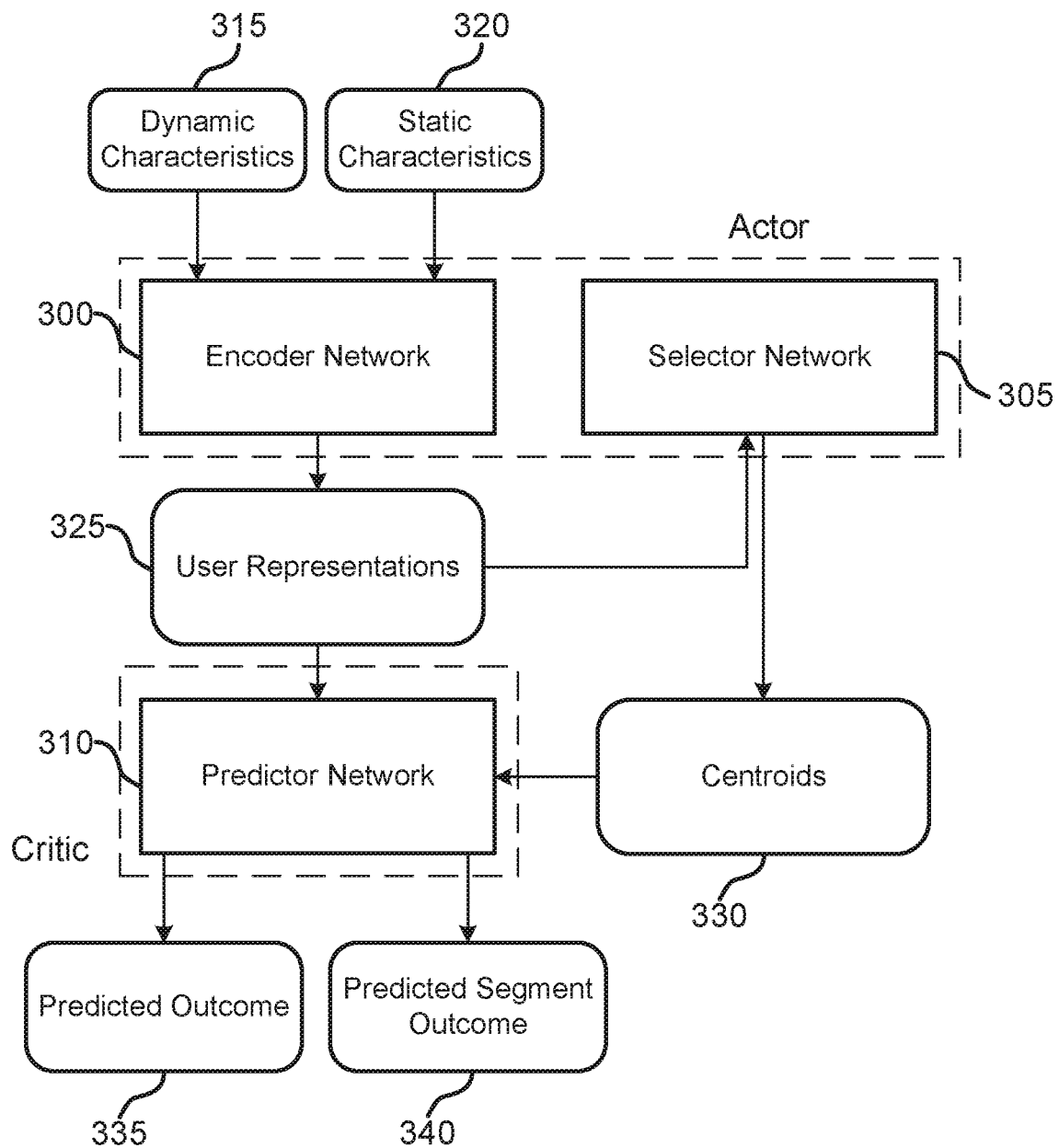
FIG. 3 shows an example of data flow in a clustering component according to aspects of the present disclosure.
Figure 4:
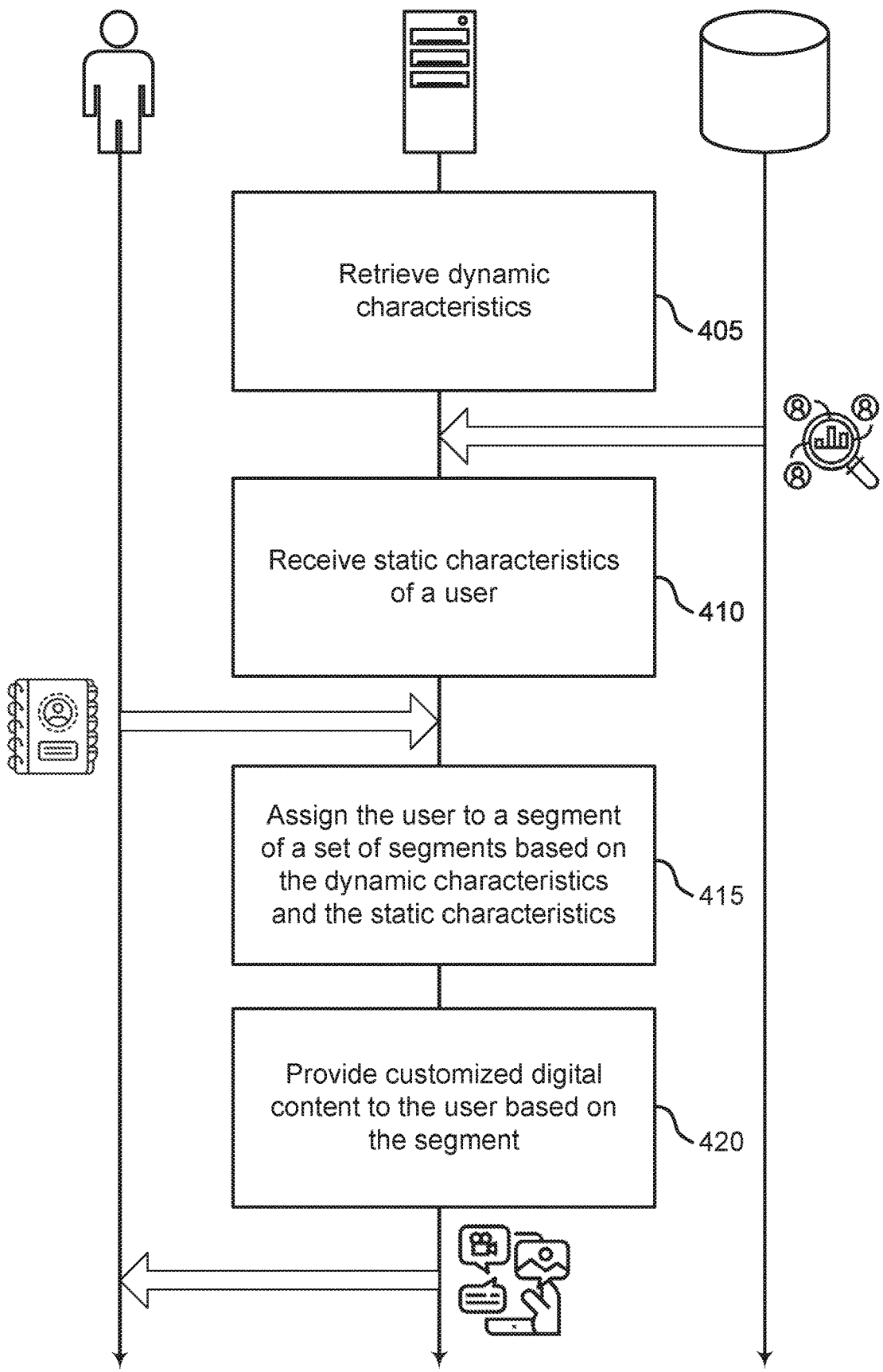
FIG. 4 shows an example of digital content delivery according to aspects of the present disclosure.

An example of the present disclosure in the digital content distribution context is provided with reference to FIGS. 1 and 4. Details regarding the architecture of a content customization system are provided with reference to FIGS. 1-3. Examples of a process for content customization are provided with reference to FIGS. 4 and 5. Examples of a process for user clustering are provided with reference to FIGS. 6 and 7.

Content Customization System

A system and an apparatus for content customization is described with reference to FIGS. 1-3. One or more aspects of the system and the apparatus include a processor; a memory storing instructions executable by the processor; a data component configured to receive dynamic characteristics for a plurality of users, wherein the dynamic characteristics include interactions between the plurality of users and a digital content channel; a clustering component configured to cluster the plurality of users based on the dynamic characteristics to obtain a plurality of segments; a segmentation component configured to assign a user to a segment of the plurality of segments based on static characteristics of the user; and a content component configured to provide customized digital content for the user based on the segment.

In some aspects, the clustering component comprises an encoder network, a selector network, and a predictor network. In some aspects, the encoder network comprises a hierarchical attention network (HAN). In some aspects, the HAN encodes a first level of the interactions based on visits to the digital content channel and a second level of the interactions based on a grouping of the visits. In some aspects, the clustering component comprises an actor-critic temporal predictive clustering (ACTPC) model.

FIG. 1 shows an example of a content customization system according to aspects of the present disclosure. The example shown includes user 100, user device 105, content customization apparatus 110, cloud 115, and database 120.

Referring to FIG. 1, user 100 provides static characteristics to content customization apparatus 110 via user device 105 and cloud 115. In some embodiments, the static characteristics include demographic information, geographic information, operating system information, browser information, media preference information, a referrer to a digital content channel, and the like. In some embodiments, content customization apparatus retrieves dynamic characteristics for a set of users from database 120 via cloud 115. In some embodiments, the dynamic characteristics include interactions between the set of users and a digital content channel. Content customization apparatus 110 assigns user 100 to a segment of a set of segments based on the dynamic characteristics and the static characteristics, and provides digital content to user 100 via user device 105 and cloud 115 based on the segment. In some embodiments, the digital content is provided via a digital content channel.

According to some aspects, user device 105 is a personal computer, laptop computer, mainframe computer, palmtop computer, personal assistant, mobile device, or any other suitable processing apparatus. In some examples, user device 105 includes software that displays a graphical user interface provided by content customization apparatus 110. In some aspects, the graphical user interface displays digital content to user 100.

According to some aspects, a user interface enables user 100 to interact with user device 105. In some embodiments, the user interface may include an audio device, such as an external speaker system, an external display device such as a display screen, or an input device (e.g., a remote control device interfaced with the user interface directly or through an IO controller module). In some cases, the user interface may be a graphical user interface (GUI).

Content customization apparatus 110 is an example of, or includes aspects of, the corresponding element described with reference to FIG. 2. According to some aspects, content customization apparatus 110 includes a computer implemented network. In some embodiments, the computer implemented network includes a machine learning model. In some embodiments, content customization apparatus 110 also includes one or more processors, a memory subsystem, a communication interface, an I/O interface, one or more user interface components, and a bus. Additionally, in some embodiments, content customization apparatus 110 communicates with user device 105 and database 120 via cloud 115.

In some cases, content customization apparatus 110 is implemented on a server. A server provides one or more functions to users linked by way of one or more of various networks, such as cloud 115. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, the server is configured to send and receive hypertext markup language (HTML) formatted files (e.g., for displaying web pages). In various embodiments, the server comprises a general purpose computing device, a personal computer, a laptop computer, a mainframe computer, a supercomputer, or any other suitable processing apparatus.

Figure 2:
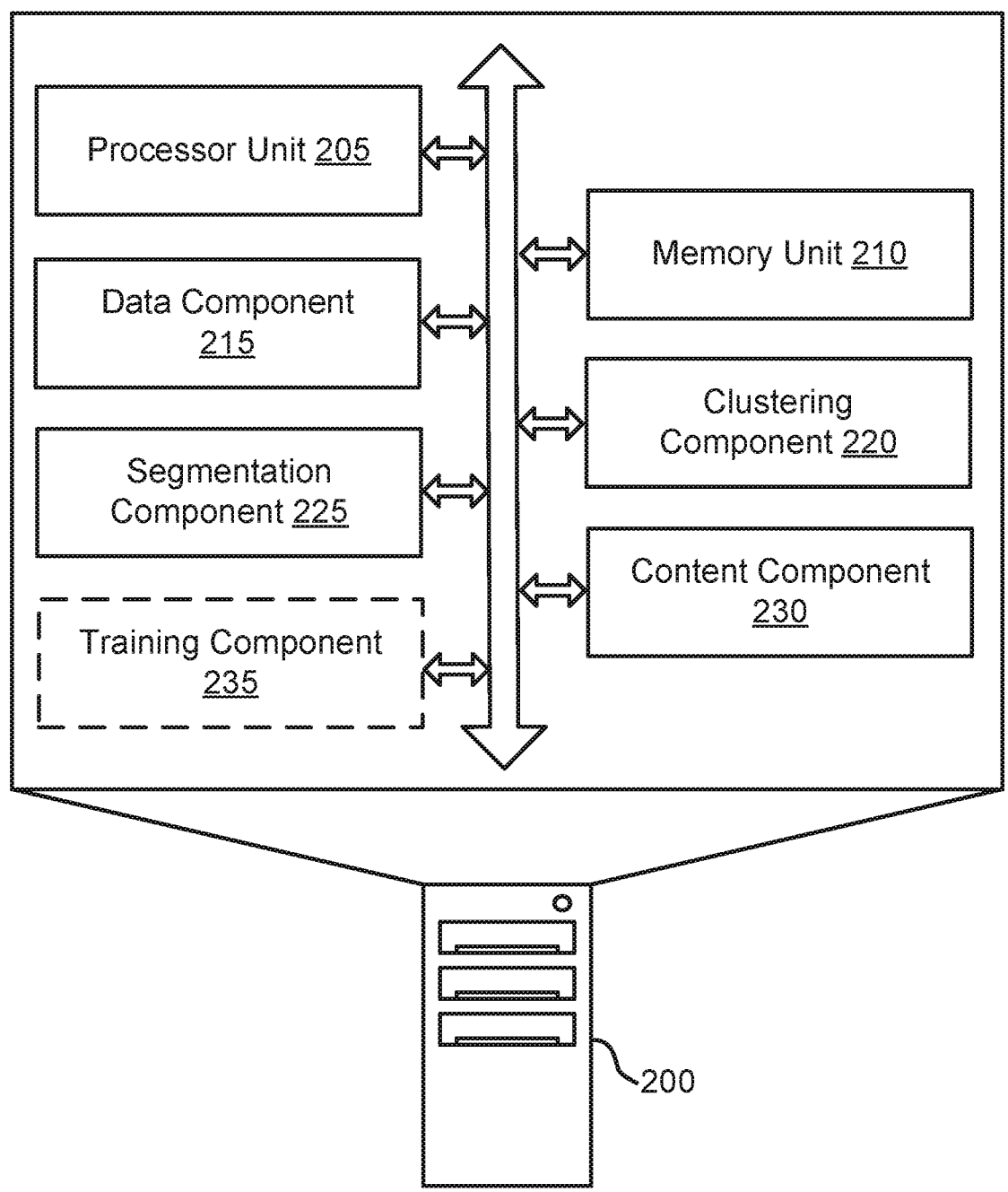
FIG. 2 shows an example of a content customization apparatus according to aspects of the present disclosure.

Further detail regarding the architecture of content customization apparatus 110 is provided with reference to FIGS. 2-3. Further detail regarding a process for content customization is provided with reference to FIGS. 4-5. Further detail regarding a process for user clustering is provided with reference to FIGS. 6-7.

Cloud 115 is a computer network configured to provide on-demand availability of computer system resources, such as data storage and computing power. In some examples, cloud 115 provides resources without active management by user 100. The term "cloud" is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location. According to some aspects, cloud 115 provides communications between user device 105, content customization apparatus 110, and database 120.

Database 120 is an organized collection of data. In an example, database 120 stores data in a specified format known as a schema. According to some aspects, database 120 is structured as a single database, a distributed database, multiple distributed databases, or an emergency backup database. In some cases, a database controller manages data storage and processing in database 120. In some cases, user 100 interacts with the database controller. In other cases, the database controller operates automatically without user interaction. In some aspects, database 120 is external to content customization apparatus 110 and communicates with content customization apparatus 110 via cloud 115. In some embodiments, database 120 is included in content customization apparatus 110.

FIG. 2 shows an example of a content customization apparatus according to aspects of the present disclosure. Content customization apparatus 200 is an example of, or includes aspects of, the corresponding element described with reference to FIG. 1. In one aspect, content customization apparatus 200 includes processor unit 205, memory unit 210, data component 215, clustering component 220, segmentation component 225, content component 230, and training component 235.

Processor unit 205 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof. In some cases, processor unit 205 is configured to operate a memory array using a memory controller. In other cases, a memory controller is integrated into processor unit 205. In some cases, processor unit 205 is configured to execute computer-readable instructions stored in memory unit 210 to perform various functions. In some embodiments, processor unit 205 includes special purpose components for modem processing, baseband processing, digital signal processing, or transmission processing.

Memory unit 210 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor of processor unit 205 to perform various functions described herein. For example, according to some aspects, memory unit 210 stores components of content customization apparatus 200 that are implemented as software. In some cases, memory unit 210 includes a basic input/output system (BIOS) that controls basic hardware or software operations, such as an interaction with peripheral components or devices. In some cases, memory unit 210 includes a memory controller that operates memory cells of memory unit 210. For example, the memory controller may include a row decoder, column decoder, or both. In some cases, memory cells within memory unit 210 store information in the form of a logical state.

According to some aspects, each of data component 215 and clustering component 220 include one or more artificial neural networks (ANNs). An ANN is a hardware or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

During a training process of an ANN, the node weights are adjusted to improve the accuracy of the result (i.e., by minimizing a loss which corresponds to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some aspects, data component 215 receives dynamic characteristics for a set of users, where the dynamic characteristics include interactions between the set of users and a digital content channel. In some examples, data component 215 monitors the interactions on the digital content channel. In some examples, data component 215 records URLs selected by the set of users based on the monitoring, where the dynamic characteristics include the URLs. In some examples, data component 215 organizes the dynamic characteristics into a hierarchy, where the interactions are grouped into sessions and the sessions are grouped into windows, and where the encoding is based on the hierarchy.

In some examples, data component 215 identifies a uniform resource locator (URL) associated with each of the interactions. In some examples, data component 215 embeds the URL in an embedding space to obtain an embedded URL, where the encoding is based on the embedded URL. In some examples, data component 215 identifies a time stamp associated with each of the interactions, where the encoding is based on the time stamp. In some examples, data component 215 orders the interactions to obtain an interaction sequence for each of the set of users, where the encoding is based on the interaction sequence.

According to some aspects, data component 215 is configured to receive dynamic characteristics for a plurality of users, wherein the dynamic characteristics include interactions between the plurality of users and a digital content channel. According to some aspects, data component 215 implements a doc2vec algorithm. In some embodiments, the doc2vec algorithm uses an ANN of data component 215 to represent text input as a word vector. According to some aspects, data component 215 is implemented as software stored in memory unit 210, as firmware, as one or more hardware circuits, or as a combination thereof.

According to some aspects, clustering component 220 clusters the set of users in a set of segments based on the dynamic characteristics using a machine learning model, where the machine learning model includes an actor-critic temporal predictive clustering (ACTPC) model. In some examples, clustering component 220 encodes the dynamic characteristics using the machine learning model to obtain a set of user representations corresponding to the set of users. In some examples, clustering component 220 maps the set of user representations to a set of segments based on the encoding.

According to some aspects, clustering component 220 encodes the dynamic characteristics using a machine learning model to obtain a set of user representations corresponding to the set of users. In some examples, clustering component 220 maps the set of user representations to a set of segments. In some examples, clustering component 220 clusters the set of users in the set of segments based on the mapping.

In some examples, clustering component 220 applies a first level of attention in the machine learning model based on the sessions. In some examples, clustering component 220 applies a second level of attention in the machine learning model based on the windows, where the set of user representations are based on the first level of attention and the second level of attention.

In some examples, clustering component 220 identifies static characteristics of the set of users, where the set of user representations is based on the static characteristics of the set of users. In some examples, clustering component 220 decodes the plurality of user representations to obtain predicted outcomes.

In some examples, clustering component 220 identifies a centroid for each of the set of segments based on the mapping. In some examples, clustering component 220 decodes the centroid to obtain a predicted segment outcome for each of the set of segments. In some examples, clustering component 220 samples a segment for each of the set of users based on an output of the mapping, where the output of the mapping includes a distribution over the set of segments for each of the set of users, and where the centroid is identified based on the sampling.

In some aspects, the clustering component 220 includes an encoder network. In some aspects, the encoder network includes a hierarchical attention network (HAN). In some embodiments, a HAN includes a first level of attention and a second level of attention, where each level of attention implements an attention mechanism for an input organized according to a hierarchy. In some embodiments, the HAN encodes a first level of the interactions based on visits to the digital content channel and a second level of the interactions based on a grouping of the visits.

In the machine learning field, an attention mechanism is a technique that includes placing differing levels of importance on different elements of an input. In some embodiments, calculating attention involves three steps. In the first step, a similarity between query vectors and key vectors obtained from the input is computed to generate attention weights. Similarity functions used for the first step can include dot product, splice, detector, and the like. In the second step, a softmax function is used to normalize the attention weights. In the third step, the attention weights are weighed together with their corresponding values.

According to some aspects, clustering component 220 includes a selector network and a predictor network. In some embodiments, each of the selector network and the predictor network is implemented as a fully connected ANN. A fully connected ANN includes one or more fully connected layers in which a neuron or perceptron applies a linear transformation to an input vector through a weights matrix and a non-linear transformation is applied to a product of the input vector and the weights matrix.

In some aspects, the clustering component 220 includes an actor-critic temporal predictive clustering (ACTPC) model. In some embodiments, the ACTPC model approaches temporal predictive clustering by learning discrete representations of an input series that corresponds to a distribution of future outcomes. In an example, the encoder network encodes input dynamic characteristics in a static characteristic latent space, the selector network maps the output of the encoder network to a predetermined set of segments, and the predictor network clusters the set of users in the set of segments based on the mapping. As used herein, the "actor" of the ACTPC model refers to the encoder network and the selector network, and the "critic" of the ACTPC model refers to the predictor network.

According to some aspects, clustering component 220 is configured to cluster the plurality of users based on the dynamic characteristics to obtain a plurality of segments. According to some aspects, each of clustering component 220, the encoder network, the selector network, and the predictor network are implemented as software stored in memory unit 210, as firmware, as one or more hardware circuits, or as a combination thereof.

According to some aspects, segmentation component 225 assigns a user to a segment of the set of segments based on static characteristics of the user. In some examples, segmentation component 225 identifies static characteristics of the set of segments based on the clustering, where the user is assigned to the segment based on the static characteristics of the set of segments and the static characteristics of the user.

According to some aspects, segmentation component 225 is configured to assign a user to a segment of the plurality of segments based on static characteristics of the user. According to some aspects, segmentation component 225 is implemented as software stored in memory unit 210, as firmware, as one or more hardware circuits, or as a combination thereof.

According to some aspects, content component 230 provides customized digital content for the user based on the segment. In some examples, content component 230 selects the segment as a target of a campaign, where the customized digital content is provided for the user based on the campaign. According to some aspects, content component 230 provides customized digital content for a user based on the clustering.

According to some aspects, content component 230 is configured to provide customized digital content for the user based on the segment. According to some aspects, content component 230 is implemented as software stored in memory unit 210, as firmware, as one or more hardware circuits, or as a combination thereof.

According to some aspects, training component 235 updates the machine learning model based on the predicted outcomes and ground-truth outcomes. In some examples, training component 235 updates the machine learning model based on the predicted segment outcome and ground-truth outcomes. According to some aspects, training component 235 is implemented as software stored in memory unit 210, as firmware, as one or more hardware circuits, or as a combination thereof. According to some aspects, training component 235 is omitted from content customization apparatus 200 and is included in a device that is external to content customization apparatus 200. In this case, the external device performs a training process for content customization apparatus 200 as described with reference to FIGS. 6 and 7 using training component 235.

FIG. 3 shows an example of data flow in a clustering component according to aspects of the present disclosure. The example shown includes encoder network 300, selector network 305, predictor network 310, dynamic characteristics 315, static characteristics 320, user representations 325, centroids 330, predicted outcome 335, and predicted segment outcome 340.

In the example illustrated by FIG. 3, encoder network 300 receives dynamic characteristics 315 and static characteristics 320 as described with reference to FIG. 6. Encoder network 300 obtains user representations 325 based on dynamic characteristics 315 and static characteristics 320 as described with reference to FIG. 6. In some embodiments, static characteristics 320 are omitted, and encoder network 300 obtains user representations 325 based on dynamic characteristics 315. Predictor network 310 generates predicted outcome 335 based on user representations 325 as described with reference to FIGS. 6 and 7. Selector network 305 generates centroids based on user representations 325. Predictor network 310 generates predicted segment outcome 340 based on centroids 330 as described with reference to FIGS. 6 and 7.

Referring to FIG. 3, encoder network 300 and selector network 305 are referred to as the "actor" of an actor-critic temporal predictive clustering (ACTPC) model, and predictor network 310 is referred to as the "critic" of the ACTPC model. In some embodiments, a machine learning model includes the ACTPC model. In some embodiments, a clustering component as described with reference to FIG. 2 includes the machine learning model.

Content Customization

A method for content customization is described with reference to FIGS. 4 and 5. One or more aspects of the method include receiving dynamic characteristics for a plurality of users, wherein the dynamic characteristics include interactions between the plurality of users and a digital content channel; clustering the plurality of users in a plurality of segments based on the dynamic characteristics using a machine learning model; assigning a user to a segment of the plurality of segments based on static characteristics of the user; and providing customized digital content for the user based on the segment. In some embodiments, the machine learning model includes an actor-critic temporal predictive clustering (ACTPC) model.

Some examples of the method further include monitoring the interactions on the digital content channel. Some examples further include recording URLs selected by the plurality of users based on the monitoring, wherein the dynamic characteristics include the URLs. Some examples of the method further include selecting the segment as a target of a campaign, wherein the customized digital content is provided for the user based on the campaign.

Some examples of the method further include encoding the dynamic characteristics using the machine learning model to obtain a plurality of user representations corresponding to the plurality of users. Some examples further include mapping the plurality of user representations to a plurality of segments based on the encoding.

Some examples of the method further include identifying static characteristics of the plurality of segments based on the clustering, wherein the user is assigned to the segment based on the static characteristics of the plurality of segments and the static characteristics of the user.

FIG. 4 shows an example of digital content delivery according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 4, the system retrieves dynamic characteristics (e.g., data relating to observed behavior on a digital content channel) for a set of users from a database and receives static characteristics of a user (such as a user as described with reference to FIG. 1). The system assigns the user to a segment of a set of segments based on the dynamic characteristics and the static characteristics and provides digital content for the user based on the segment. In some embodiments, the system extrapolates outcomes based on user behavior, enabling a given user to be confidently correlated in a segment corresponding to a desired outcome (such as a purchase of a given product or service) than if static characteristics alone were used for correlation. Furthermore, in some embodiments, the system performs user-level content customization or static characteristic-level content customization for the user or a group of users by assigning the user to the segment of the plurality of segments based on the clustering, thereby providing customized digital content based on a correlation in the segment between the static characteristic of the user and a probability of a target outcome that exceeds a predetermined threshold.

At operation 405, the system retrieves dynamic characteristics. In some cases, the operations of this step refer to, or may be performed by, a content customization apparatus as described with reference to FIGS. 1 and 2. In an example, the content customization apparatus retrieves the dynamic characteristics as described with reference to FIGS. 5 and 6.

At operation 410, the system receives static characteristics of a user. In some cases, the operations of this step refer to, or may be performed by, a content customization apparatus as described with reference to FIGS. 1 and 2. In an example, the content customization apparatus receives the static characteristics of the user as described with reference to FIGS. 5 and 6.

At operation 415, the system assigns the user to a segment of a set of segments based on the dynamic characteristics and the static characteristics. In some cases, the operations of this step refer to, or may be performed by, a content customization apparatus as described with reference to FIGS. 1 and 2. In an example, the content customization apparatus assigns the user to the segment as described with reference to FIG. 5.

At operation 420, the system provides customized digital content for the user based on the segment. In some cases, the operations of this step refer to, or may be performed by, a content customization apparatus as described with reference to FIGS. 1 and 2. In an example, the system provides the customized digital content for the user as described with reference to FIG. 5.

Figure 5:
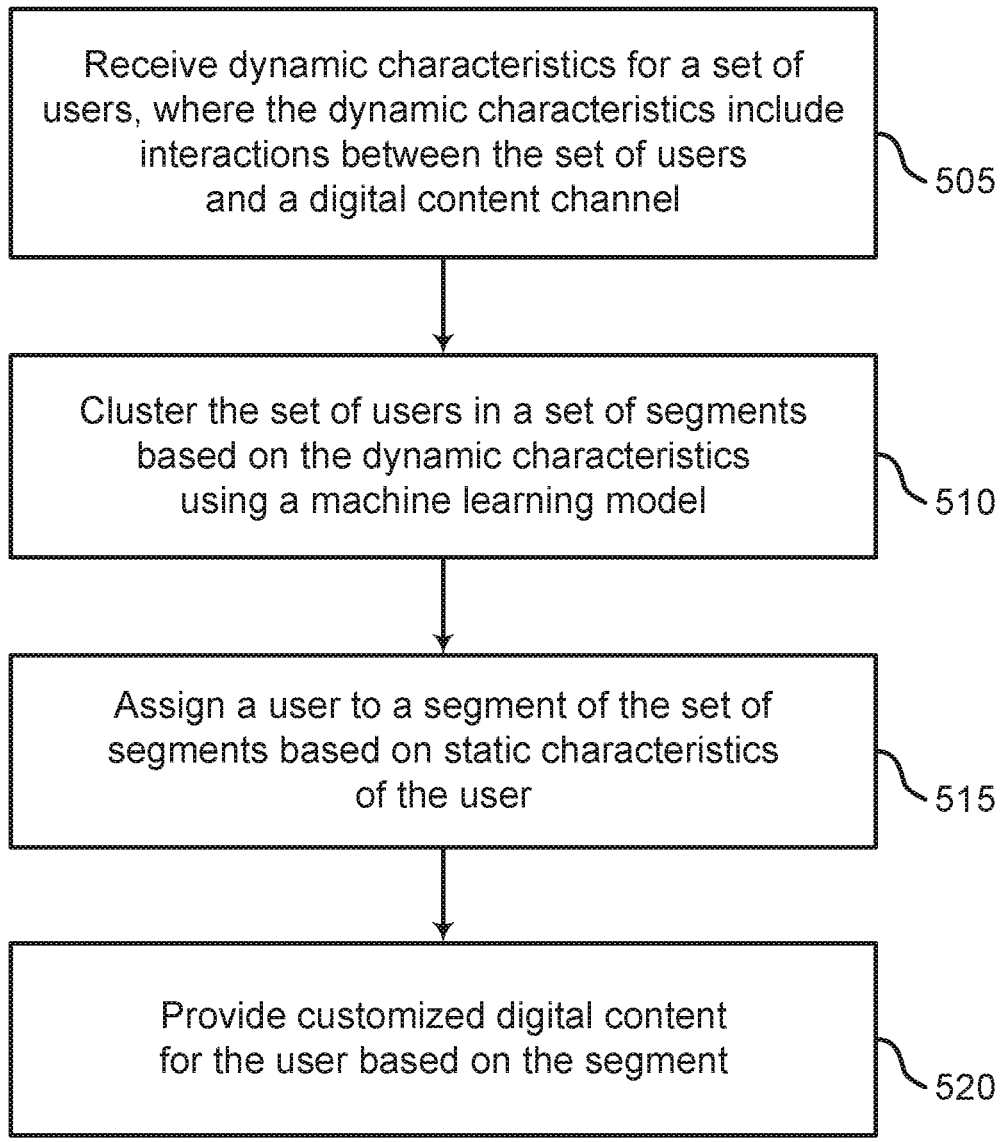
FIG. 5 shows an example of providing customized digital content to a user according to aspects of the present disclosure.

FIG. 5 shows an example of providing customized digital content to a user according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 5, the system receives dynamic characteristics (e.g., data relating to observed behavior such as interactions on a digital content channel) for a set of users. The system clusters the set of users in a set of segments based on the dynamic characteristics using an actor-critic temporal predictive clustering (ACTPC) machine learning model, assigns a user to a segment of the plurality of segments based on a static characteristic of the user, and provides customized digital content for the user based on the segment. In some embodiments, the system therefore extrapolates outcomes based on user behavior, enabling a given user to be confidently correlated in a segment corresponding to a desired outcome (such as a purchase of a given product or service) than if static characteristics alone were used for determining the correlation.

Furthermore, in some embodiments, the system performs user-level content customization or static characteristic-level content customization for the user or a group of users by assigning the user to the segment of the plurality of segments based on the clustering, thereby providing customized digital content based on a correlation in the segment between the static characteristic of the user and a probability of a target outcome that exceeds a predetermined threshold.

At operation 505, the system receives dynamic characteristics for a set of users, where the dynamic characteristics include interactions between the set of users and a digital content channel. In some cases, the operations of this step refer to, or may be performed by, a data component as described with reference to FIG. 2.

In some embodiments, the dynamic characteristics include behavioral data corresponding to time-stamped events that occur as a result of a user interaction on a digital content channel, such as an opening an email, a hyperlink click, a display click, a download, webpage visits, and the like. In some embodiments, the data component monitors the interactions on the digital content channel and records URLs selected by the set of users based on the monitoring, where the dynamic characteristics include the URLs.

In some embodiments, the data component obtains the time stamps associated with the interactions via the monitoring of the digital content channel. In some embodiments, the data component stores the dynamic characteristics on a database as described with reference to FIG. 2 and retrieves the dynamic characteristics from the database. In some embodiments, the data component receives the dynamic characteristics as described with reference to FIG. 6.

At operation 510, the system clusters the set of users in a set of segments based on the dynamic characteristics using a machine learning model. In some cases, the operations of this step refer to, or may be performed by, a clustering component as described with reference to FIG. 2.

According to some aspects, the clustering component clusters the set of users in the set of segments based on the dynamic characteristics as described with reference to FIGS. 6 and 7. In an example, the clustering component encodes the dynamic characteristics using the machine learning model to obtain a set of user representations in a static space corresponding to the set of users, and maps the plurality of user representations to the set of segments based on the encoding.

According to some aspects, the machine learning model includes an actor-critic predictive clustering (ACTPC) model. According to some aspects, the ACTPC model includes an encoder network, a selector network, and a predictor network as described with reference to FIGS. 2 and 3. In some embodiments, by using the ACTPC model, the system approaches temporal predictive clustering by learning discrete representations of an input series that corresponds to a distribution of future outcomes. In an example, the encoder network encodes input dynamic characteristics in a static characteristic latent space, the selector network maps the output of the encoder network to a predetermined set of segments, and the predictor network clusters the set of users in the set of segments based on the mapping. As used herein, the "actor" of the ACTPC model refers to the encoder network and the selector network, and the "critic" of the ACTPC model refers to the predictor network.

Accordingly, by encoding the dynamic characteristics in a static characteristics space, and clustering the users in the segments based on the mapping, some embodiments of the present disclosure thereby extrapolate outcomes based on user behavior, enabling a given user to be confidently correlated in a segment corresponding to a target outcome than if static characteristics alone were used for correlation.

At operation 515, the system assigns a user to a segment of the set of segments based on static characteristics of the user. In some cases, the operations of this step refer to, or may be performed by, a segmentation component as described with reference to FIG. 2.

In some embodiments, the segments in the set of segments are predetermined. An example segment is group of users who purchase a given product or service while also being associated with a given static characteristic (such as a geographical location, a browser, an operating system, etc.). In some embodiments, the number of segments in the set of segments is predetermined. In some embodiments, the segmentation component identifies static characteristics of the set of segments based on the clustering. In an example, the clustering component provides the set of segments and a set of clusters corresponding to the set of segments obtained by the clustering as described with reference to FIGS. 6 and 7 to the segmentation component.

According to some aspects, the segmentation component assigns the user to the segment based on the static characteristics of the set of segments and the static characteristics of the user. In an example, the segmentation component receives the static characteristic of the user (for example, by retrieving the static characteristic from a database, recording the static characteristic from a monitored digital content channel that a user device associated with the user visits, or receiving the static characteristic from a third-party user).

In some embodiments, the segmentation component identifies a group of clusters including a static characteristic of the set of static characteristics that matches the static characteristic of the user, identifies a cluster of the group of clusters that includes a highest likelihood of a predicted outcome (such as a conversion), and assigns the user to the segment corresponding to the cluster based on the identification of the cluster. In some embodiments, the segmentation component repeats this process to identify a list of segments that correspond to the static characteristic of the user and predicted outcomes. In some embodiments, based on the clustering, the segmentation component identifies static characteristics that correspond to a highest likelihood of a predicted outcome.

In some embodiments, the segmentation component provides the assignment of the user, the list of segments, and/or information describing the static characteristics that correspond to the highest likelihood of the predicted outcome to a user of the system via a user interface. In some embodiments, the segmentation component displays the user interface via a user device. Accordingly, the segmentation component is able to provide a representation of a user-level content customization or a static characteristic-level content customization for a user or a group of users that allow a third-party user of the system to more precisely determine to which users digital content should be provided to. In an example, a third-party user of the system may use this representation to determine that a user having a static characteristic of a given geographic location is most likely to purchase a given product or service, and therefore decide that customized digital content associated with the product or service should be targeted towards users associated with the given geographical location.

At operation 520, the system provides customized digital content for the user based on the segment. In some cases, the operations of this step refer to, or may be performed by, a content component as described with reference to FIG. 2. In some embodiments, the content component receives the user-level content customization or static characteristic-level content customization for the user or a group of users from the segmentation component and provides the customized digital content for the user based on the segment in response. In an example, the content component provides the customized digital content in response to a correlation in the segment between the static characteristic of the user and a probability of a target outcome that exceeds a predetermined threshold.

In some embodiments, the third-party user of the system receives the representation of the user-level content customization or static characteristic-level content customization for the user or a group of users from the segmentation component and may decide to target the customized digital content for the user based on the representation. In some embodiments, the third-party user of the system provides an input to the content component (for example, via a user interface of a user device) to provide the customized digital content to the user.

In some embodiments, the content component provides the customized digital content by providing the customized digital content to a digital content channel and instructing the digital content channel to display the customized digital content when the digital content channel is visited by the user.

In some embodiments, the content component selects the segment as a target of a campaign, and the customized digital content is provided for the user based on the campaign. For example, in some cases, a target outcome and a static characteristic corresponding to each segment of the set of segments is predetermined according to campaign parameters provided by a third-party user of the system, and customized digital content is associated with each segment of the set of segments according to the campaign parameters. In an example, when the user is assigned to the segment, the content component provides the digital content for the user based on the campaign parameters.

User Clustering

A method for content customization is described with reference to FIGS. 6 and 7. One or more aspects of the method include receiving dynamic characteristics for a plurality of users, wherein the dynamic characteristics include interactions between the plurality of users and a digital content channel; encoding the dynamic characteristics using a machine learning model to obtain a plurality of user representations corresponding to the plurality of users; mapping the plurality of user representations to a plurality of segments; clustering the plurality of users in the plurality of segments based on the mapping; and providing customized digital content for a user based on the clustering.

Some examples of the method further include identifying a uniform resource locator (URL) associated with each of the interactions. Some examples further include embedding the URL in an embedding space to obtain an embedded URL, wherein the encoding is based on the embedded URL.

Some examples of the method further include identifying a time stamp associated with each of the interactions, wherein the encoding is based on the time stamp. Some examples of the method further include ordering the interactions to obtain an interaction sequence for each of the plurality of users, wherein the encoding is based on the interaction sequence.

Some examples of the method further include organizing the dynamic characteristics into a hierarchy, wherein the interactions are grouped into sessions and the sessions are grouped into windows, and wherein the encoding is based on the hierarchy. Some examples of the method further include applying a first level of attention in the machine learning model based on the sessions. Some examples further include applying a second level of attention in the machine learning model based on the windows, wherein the plurality of user representations are based on the first level of attention and the second level of attention.

Some examples of the method further include identifying static characteristics of the plurality of users, wherein the plurality of user representations is based on the static characteristics of the plurality of users. Some examples further include decoding the plurality of user representations to obtain predicted outcomes. Some examples further include updating the machine learning model based on the predicted outcomes and ground-truth outcomes.

Some examples of the method further include identifying a centroid for each of the plurality of segments based on the mapping. Some examples further include decoding the centroid to obtain a predicted segment outcome for each of the plurality of segments. Some examples further include updating the machine learning model based on the predicted segment outcome and ground-truth outcomes.

Some examples of the method further include sampling a segment for each of the plurality of users based on an output of the mapping, wherein the output of the mapping comprises a distribution over the plurality of segments for each of the plurality of users, and wherein the centroid is identified based on the sampling.

Figure 6:
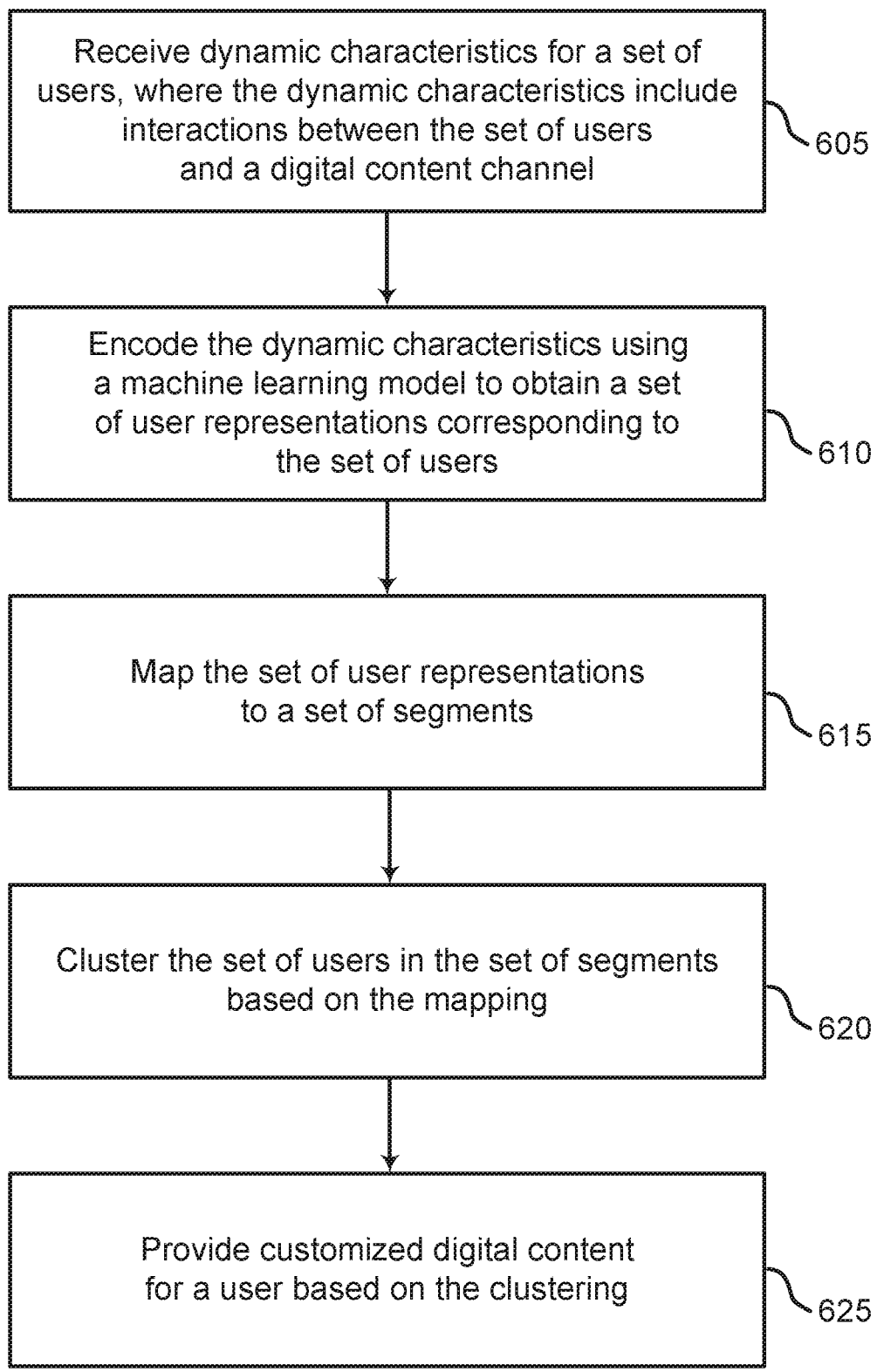
FIG. 6 shows an example of user clustering according to aspects of the present disclosure.

FIG. 6 shows an example of user clustering according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 6, the system clusters a set of users based on dynamic characteristics using a machine learning model. In some embodiments, the system receives dynamic characteristics for a set of users and encodes the dynamic characteristics in a static characteristics space. The system then maps the set of users to a set of segments based on the encoding, and clusters the set of users in the set of segments based on the mapping. The system then provides customized digital content for a user based on the clustering.

Accordingly, by encoding the dynamic characteristics in a static characteristics space, and clustering the users in the segments based on the mapping, some embodiments of the present disclosure thereby extrapolate outcomes based on user behavior, enabling a given user to be confidently correlated in a segment corresponding to a desired outcome (such as a purchase of a given product or service) and an item of customized digital content than if static characteristics alone were used to determine the correlation.

At operation 605, the system receives dynamic characteristics $x_{1:t}^n = \{x_1, x_2, \ldots x_t\}$ for n users in a set of users, where the dynamic characteristics $x_{1:t}^n$ includes interactions between the set of users and a digital content channel at time stamps t. In some cases, the operations of this step refer to, or may be performed by, a data component as described with reference to FIG. 2. In an example, the data component receives the dynamic characteristics $x_{1:t}^n$ for the set of n users as described with reference to FIG. 5.

According to some aspects, the data component identifies a uniform resource locator (URL) associated with each of the interactions. In an example, the data component identifies the URL by recording URLs selected by the set of users while the data component is monitoring the digital content channel. In some embodiments, the data component identifies the URL by retrieving the URL from a database as described with reference to FIG. 2. In some embodiments, the dynamic characteristics includes the URL.

In some embodiments, the data component embeds the URL in an embedding space to obtain an embedded URL. In some embodiments, the data component embeds the URL using a doc2vec algorithm as described with reference to FIG. 2.

According to some aspects, the data component identifies the time stamp t associated with each of the interactions. In some embodiments, the data component identifies the time stamp t by monitoring the digital content channel and recording a time and date upon which each of the interactions occurs. In some embodiments, the time stamp t is retrieved from the database. In some embodiments, the dynamic characteristics include the time stamp t. According to some aspects, the data component orders the interactions to obtain an interaction sequence for each of the plurality of users. In an example, the data component sorts the interactions by time stamps t and users n to obtain the interaction sequence. In some embodiments, the dynamic characteristics include the interaction sequence.

According to some aspects, the data component organizes the dynamic characteristics $x_{1:t}^n$ into a hierarchy. In an example, the data component groups the interactions into sessions and groups the sessions into windows. In some embodiments, each of a session and a window are periods of time having predetermined lengths. In some embodiments, the periods of time are adjustable. According to some aspects, the dynamic characteristics $x_{1:t}^n$ are organized according to the time stamps associated with the dynamic characteristics $x_{1:t}^n$. In some embodiments, the data component organizes the dynamic characteristics $x_{1:t}^n$ into the hierarchy by organizing the embedded URLs associated with each of the interactions into sessions and windows. In some embodiments, the sessions and windows are grouped using time stamps t included in the interaction sequence.

At operation 610, the system encodes the dynamic characteristics $x_{1:t}^n$ using a machine learning model to obtain a set of user representations corresponding to the set of users. In some cases, the operations of this step refer to, or may be performed by, a clustering component as described with reference to FIG. 2. In some embodiments, a user representation of the set of user representations is a hidden representation of latent tendency of a user corresponding to a given outcome (such as a conversion, or purchase, of a given product or service).

In some embodiments, the encoding is based on the embedded URL. In an example, the encoder network encodes an embedded URL included in the dynamic characteristics $x_{1:t}^n$ to obtain a user representation of the set of user representations. In some embodiments, the encoding is based on the time stamp. In an example, the encoder network encodes a time stamp included in the dynamic characteristics $x_{1:t}^n$ to obtain a user representation of the set of user representations. In some embodiments, the encoding is based on the interaction sequence. In an example, the encoder network encodes the interaction sequence included in the dynamic characteristics $x_{1:t}^n$ to obtain a user representation of the set of user representations.

In some embodiments, the encoding is based on the hierarchy. In an example, the HAN encodes a first level of the interactions based on visits to the digital content channel and a second level of the interactions based on a grouping of the visits. According to some aspects, an encoder network of the clustering component as described with reference to FIGS. 2 and 3 applies a first level of attention in the machine learning model based on the sessions and applies a second level of attention in the machine learning model based on the windows, where the plurality of user representations are based on the first level of attention and the second level of attention. In an example, the encoder network includes a hierarchical attention network (HAN) in which dynamic characteristics included in a session are encoded using the first level of attention and dynamic characteristics included in two or more sessions of a window is encoded using the second level of attention. In some embodiments, the machine learning model includes the HAN.

In some embodiments, the set of user representations is on a static characteristics space. By encoding the dynamic characteristics in a static characteristics space, and clustering the users in the segments based on the mapping, some embodiments of the present disclosure thereby extrapolate outcomes based on user behavior, enabling a given user to be confidently correlated in a segment corresponding to a desired outcome (such as a purchase of a given product or service) than if static characteristics alone were used for correlation.

According to some aspects, the clustering component identifies static characteristics of the plurality of users, and the set of user representations is based on the static characteristics of the plurality of users. In an example, the data component retrieves static characteristics associated with the set of users from a database and provides the static characteristics to the encoder network of the clustering component. In some embodiments, the static characteristics include demographic information, geographic information, operating system information, browser information, media preference information, and the like. The encoder network identifies the static characteristics of the set of users in response to receiving the static characteristics. According to some aspects, by allowing static characteristics to influence the set of user representations, at least one embodiment of the present disclosure provides a method that also accounts for static characteristics in clustering the set of users, which may be desirable in some scenarios.

According to some aspects, the user representation is based on the static characteristics of the plurality of users. In some embodiments, the encoder network concatenates the dynamic characteristics $x_{1:t}^n$ with the static characteristics to obtain concatenated data and encodes the concatenated data to obtain the user representation At operation 615, the system maps the set of user representations to a set of segments. In some cases, the operations of this step refer to, or may be performed by, a clustering component as described with reference to FIG. 2.

In some embodiments, the number of segments in the set of segments is predetermined. In some embodiments, the clustering component learns the number of segments by iteratively varying the number of segments and picking a number of segments that corresponds to a greatest predictive performance. An example segment is group of users who make a conversion (i.e., a purchase) of a given product or service while also being associated with a given static characteristic (such as a given geographical location, a browser, an operating system, etc.). In some embodiments, the number of segments in the set of segments is predetermined. In some embodiments, a predictor network of the clustering component as described with reference to FIGS. 2 and 3 maps the set of user representations to the set of segments by decoding the set of user representations to obtain predicted outcomes.

In an example, each segment of the set of segments corresponds to a ground-truth outcome (such as a known conversion), and the predicted outcome is a likelihood that the user representation corresponds to the ground-truth outcome. In an example, the predictor network maps the set of user representations to the set of representations by mapping each user of the set of users to one or more segments of the set of segments based on the predicted outcome. In some embodiments, the predictor network maps the user to the segment when the predicted outcome exceeds a predetermined probability threshold.

According to some aspects, a training component as described with reference to FIG. 2 updates the machine learning model based on the predicted outcomes and ground-truth outcomes. In an example, the training component retrieves a set of ground-truth outcomes from the database and receives the predicted outcomes from the clustering component.

In some embodiments, the training component calculates a predicted outcome loss using a predicted outcome loss function. The term "loss function" refers to a function that impacts how a machine learning model is trained in a supervised learning model. Specifically, during each training iteration, the output of the model is compared to the known annotation information in the training data. The loss function provides a value (a "loss") for how close the predicted annotation data is to the actual annotation data. After computing the loss, the parameters of the model are updated accordingly and a new set of predictions are made during the next iteration.

In some embodiments, the training component computes the predicted outcome loss $\mathcal{L}_I^{(1)}$ using the predicted outcome loss function:

$$\mathcal{L}_I^{(1)}(\theta, \phi) = \mathbb{E}_{x,y \sim p_{xy}}\left[-\sum_{t \in T} \ell_1(y_t, \hat{y}_t)\right] \quad (1)$$

where $y_t$ is a ground-truth outcome, $\hat{y}_t$ is a predicted outcome, $\theta$ is a parameterization of the encoder network, and $\phi$ is a parameterization of the predictor network. In some embodiments, the training component updates the parameters of the encoder network and the predictor network according to the predicted outcome loss $\mathcal{L}_I^{(1)}$.

According to some aspects, the training component updates the machine learning model based on a predicted segment outcome as described with reference to FIG. 7.

At operation 620, the system clusters the set of users in the set of segments based on the mapping. In some cases, the operations of this step refer to, or may be performed by, a clustering component as described with reference to FIG. 2. In some embodiments, the clustering component clusters the users by performing K-means clustering over the obtained user representations $z_t^n$ for all users n and time stamps t to obtain a set of clusters. In some embodiments, by clustering the set of users based on mapping that is based on dynamic characteristics, the system recognizes that two users may have a same predictive probability of outcome and a same static characteristic, but correspond to different dynamic characteristics, and should therefore be clustered in separate segments. Conventional techniques for generating user groups may fail to account for differences exhibited by user behavior in this manner, and may organize two users in a same group when the underlying dynamic characteristics suggest they should be placed in separate groups.

Accordingly, in some embodiments, given dynamic characteristics of a set of users, the clustering component identifies behavior-based clusters that yield a set of static characteristics for each cluster. Therefore, if a third-party user such as a business wishes to identify a second set of users akin to users in a cluster based on dynamic characteristics corresponding to the cluster, but does not have access to data associated with the second set of users, the third-party user may provide a content provider with the set of static characteristics yielded by the cluster and ask the content provider to reach out to the second set of users based on the set of static characteristics. In contrast, conventional content distribution techniques do not determine a set of static characteristics via clustering a set of users based on dynamic characteristics, and therefore are not able to effectively extrapolate helpful static characteristics based on dynamic characteristics.

At operation 625, the system provides customized digital content for a user based on the clustering. In some cases, the operations of this step refer to, or may be performed by, a content component as described with reference to FIG. 2. In some embodiments, the content component provides the customized digital content for the user based on the clustering as described with reference to FIG. 5.

Figure 7:
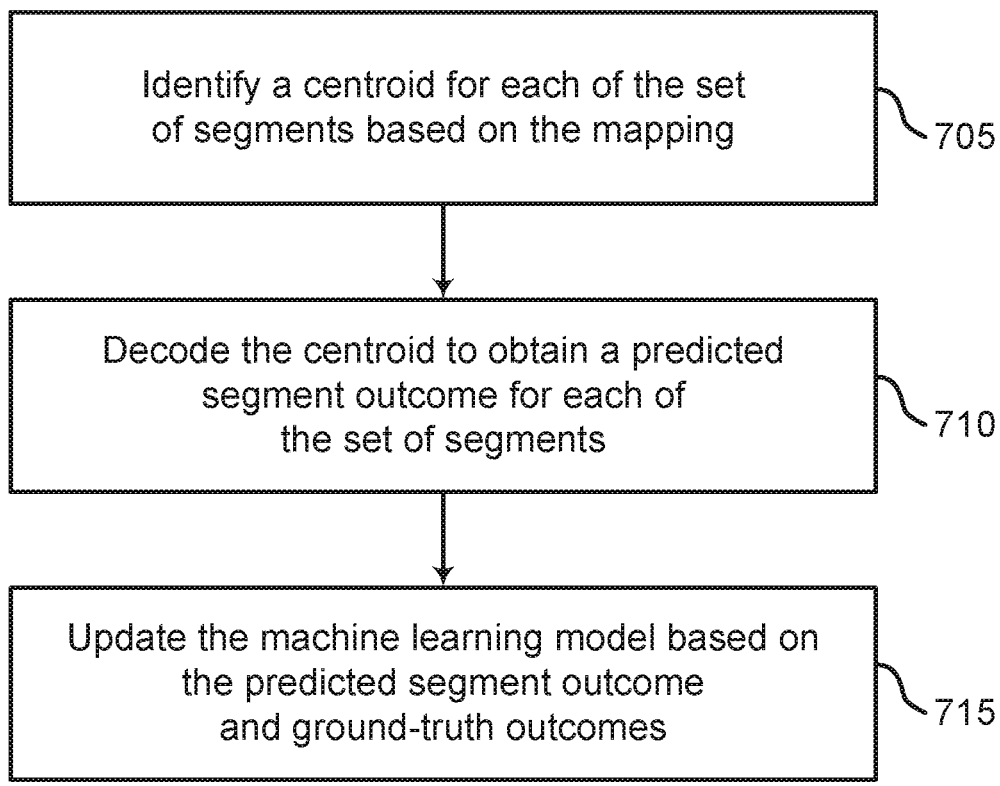
FIG. 7 shows an example of updating a machine learning model according to aspects of the present disclosure.

FIG. 7 shows an example of updating a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system identifies a centroid for each of the set of segments based on the mapping. In some cases, the operations of this step refer to, or may be performed by, a clustering component as described with reference to FIG. 2.

In an example, a selector network as described with reference to FIGS. 2 and 3 samples a segment for each of the set of users based on an output of the mapping described with reference to FIG. 6, where the output of the mapping includes a distribution over the set of segments $\pi_t$ for each of the set of users. In some embodiments, the selector network identifies the centroid $e(s_t)$ of a cluster of the set of cluster corresponding to a segment of the set of segments. In an example, given a sampled segment assignment $s_t$, the selector component uses an embedding dictionary $\varepsilon$ of centroids of K segments to output the centroid $e(s_t)$. In some embodiments, the embedding dictionary $\varepsilon$ is a set of cluster centroids lying in a latent space that represents a corresponding cluster. In some embodiments, the selector network initializes the embedding dictionary $\varepsilon$ by performing the K-means clustering as described with reference to FIG. 6. In some embodiments, the selector component provides the centroid $e(s_t)$ to the predictor component, and the predictor component identifies the centroid $e(s_t)$ in response to receiving the centroid $e(s_t)$.

At operation 710, the system decodes the centroid to obtain a predicted segment outcome for each of the set of segments. In some cases, the operations of this step refer to, or may be performed by, a clustering component as described with reference to FIG. 2. In an example, the predictor network decodes the centroid $e(s_t)$ to obtain the predicted segment outcome $\bar{y}_t$.

At operation 715, the system updates the machine learning model based on the predicted segment outcome and ground-truth outcomes. In some cases, the operations of this step refer to, or may be performed by, a training component as described with reference to FIG. 2.

In an example, the training component receives the predicted segment outcome $\bar{y}_t$ from the predictor network and calculates a first predicted segment outcome loss $\mathcal{L}_1$ and a second predicted segment outcome loss $\mathcal{L}_2$:

$$\mathcal{L}_1(\theta, \phi, \psi, \varepsilon) = \mathbb{F}_{x,y \sim pxy}\left[\sum_{t \in T} \mathbb{F}_{s_t \sim Cat(\pi_t)}[\ell_1(y_t, \bar{y}_t)]\right] \quad (2)$$

$$\mathcal{L}_2(\theta, \psi) = \mathbb{F}_{x \sim px}\left[-\sum_{t \in T}\sum_{k \in K} \pi_t(k)\log \pi_t(k)\right] \quad (3)$$

where $s_t \sim Cat(\pi_t)$ is the output of the selector network, $\psi$ is a parameterization of the selector network, and $k \in K$ is the set centroids $e(s_t)$.

According to some aspects, the training component computes a combined predicted segment outcome loss $\mathcal{L}_A$ based on the first predicted segment outcome loss $\mathcal{L}_1$ and the second predicted segment outcome loss $\mathcal{L}_2$:

$$\mathcal{L}_A(\theta, \phi, \psi) = \mathcal{L}_1(\theta, \phi, \psi) + \alpha \mathcal{L}_2(\theta, \psi) \quad (4)$$

where $\alpha$ is a hyperparameter.

According to some aspects, the training component updates the parameters of the encoder network and the selector network based on the combined predicted segment outcome loss $\mathcal{L}_A$. In some embodiments, the first term $\mathcal{L}_1(\theta, \phi, \psi)$ helps to separate the clusters, such that a user that is predicted to belong to segment has a high probability of being associated with a cluster corresponding to the segment. In some embodiments, the second term $\alpha \mathcal{L}_2(\theta, \psi)$ provides the amount of loss in predicting a segment outcome from the centroid $e(s_t)$.

According to some aspects, the training component computes a gradient of the combined predicted segment outcome loss $\mathcal{L}_A$ with respect to $\omega_A[\theta, \psi]$:

$$\nabla \omega_A \mathcal{L}_A(\theta, \phi, \psi) = \quad (5)$$
$$\mathbb{F}_{x,y \sim pxy}\left[\sum_{t \in T} \mathbb{F}_{s_t \sim Cat(\pi_t)}[\ell_1(y_t, \bar{y}_t) \nabla \omega_A \log \pi_t(s_t)]\right] + \alpha \Delta \omega_A \mathcal{L}_2(\theta, \psi)$$

According to some aspects, the training component updates the parameters of the encoder network and the selector network based on the gradient of the combined predicted segment outcome loss $\mathcal{L}_A$ with respect to $\omega_A[\theta, \psi]$.

According to some aspects, the training component computes a centroid separation loss $\mathcal{L}_E$:

$$\mathcal{L}_3(\varepsilon) = -\sum_{k \neq k'} \ell_1(g_\phi(e(k)), g_\phi(e(k'))) \quad (6)$$

$$\mathcal{L}_E = \mathcal{L}_1(\varepsilon) + \beta \mathcal{L}_3(\varepsilon) \quad (7)$$

where $g_\phi$ is the predictor network and $\beta$ is a hyperparameter. In some embodiments, the training component updates the parameters of the machine learning model based on the centroid separation loss $\mathcal{L}_E$. Accordingly, in some embodiments, the system encourages machine learning model to obtain centroids that are well separated.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for content customization comprising:
receiving, by a data component, static characteristics and dynamic characteristics for a plurality of users, wherein the dynamic characteristics include interactions between the plurality of users and a digital content channel;
encoding, by a clustering component, the dynamic characteristics to obtain user representations of the plurality of users in a latent space of the static characteristics;
clustering, by the clustering component, the plurality of users in a plurality of segments based on the user representations;
assigning, by a segmentation component, a user to a segment of the plurality of segments based on the user representations and the static characteristics; and
providing, by a content component, customized digital content for the user based on the segment.

2. The method of claim 1, further comprising:
monitoring, by the data component, the interactions on the digital content channel; and
recording, by the data component, URLs selected by the plurality of users based on the monitoring, wherein the dynamic characteristics include the URLs.

3. The method of claim 1, wherein:
the clustering component comprises an actor-critic temporal predictive clustering (ACTPC) model.

4. A method for content customization comprising:
receiving, by a data component, static characteristics and dynamic characteristics for a plurality of users, wherein the dynamic characteristics include interactions between the plurality of users and a digital content channel;
encoding, by a clustering component, the dynamic characteristics using a machine learning model to obtain user representations of the plurality of users in a latent space of the static characteristics;
mapping, by the clustering component, the user representations to a plurality of segments based on the user representations;
clustering, by the clustering component, the plurality of users in the plurality of segments based on the user representations and the mapping; and
providing, by a content component, customized digital content for a user based on the clustering.

5. The method of claim 4, further comprising:
identifying, by the data component, a uniform resource locator (URL) associated with each of the interactions; and
embedding, by the data component, the URL in an embedding space to obtain an embedded URL, wherein the encoding is based on the embedded URL.

6. The method of claim 4, further comprising:
identifying, by the data component, a time stamp associated with each of the interactions, wherein the encoding is based on the time stamp.

7. The method of claim 4, further comprising:
ordering, by the data component, the interactions to obtain an interaction sequence for each of the plurality of users, wherein the encoding is based on the interaction sequence.

8. The method of claim 4, further comprising:
organizing, by the data component, the dynamic characteristics into a hierarchy, wherein the interactions are grouped into sessions and the sessions are grouped into windows, and wherein the encoding is based on the hierarchy.

9. The method of claim 4, wherein:
the user representations are based on the static characteristics.

10. The method of claim 4, further comprising:
decoding, by the clustering component, the user representations to obtain predicted outcomes; and
updating, by a training component, the machine learning model based on the predicted outcomes and ground-truth outcomes.

11. The method of claim 4, further comprising:
identifying, by the clustering component, a centroid for each of the plurality of segments based on the mapping;
decoding, by the clustering component, the centroid to obtain a predicted segment outcome for each of the plurality of segments; and
updating, by a training component, the machine learning model based on the predicted segment outcome and ground-truth outcomes.

12. The method of claim 8, further comprising:
applying, by the clustering component, a first level of attention in the machine learning model based on the sessions; and
applying, by the clustering component, a second level of attention in the machine learning model based on the windows, wherein the user representations are based on the first level of attention and the second level of attention.

13. The method of claim 11, further comprising:
sampling, by the clustering component, a segment for each of the plurality of users based on an output of the mapping, wherein the output of the mapping comprises a distribution over the plurality of segments for each of the plurality of users, and wherein the centroid is identified based on the sampling.

14. An apparatus for content customization comprising:
a processor;
a memory storing instructions executable by the processor;
a data component configured to receive static characteristics and dynamic characteristics for a plurality of users, wherein the dynamic characteristics include interactions between the plurality of users and a digital content channel;
a clustering component configured to encode the dynamic characteristics to obtain user representations of the plurality of users in a latent space of the static characteristics and to cluster the plurality of users in a plurality of segments based on the user representations;
a segmentation component configured to assign a user to a segment of the plurality of segments based on the user representations and the static characteristics; and
a content component configured to provide customized digital content for the user based on the segment.

15. The apparatus of claim 14, wherein:
the clustering component comprises an encoder network, a selector network, and a predictor network.

16. The apparatus of claim 14, wherein:
the clustering component comprises an actor-critic temporal predictive clustering (ACTPC) model.

17. The apparatus of claim 15, wherein:
the encoder network comprises a hierarchical attention network (HAN).

18. The apparatus of claim 17, wherein:
the HAN encodes a first level of the interactions based on visits to the digital content channel and a second level of the interactions based on a grouping of the visits.

* * * * *